United States Patent

Wang

[11] Patent Number: 6,113,046
[45] Date of Patent: Sep. 5, 2000

[54] ANGLE-ADJUSTABLE, AUTO-LOCKING APPARATUS SUPPORT

[76] Inventor: James Wang, 1F, No. 63, Alley 8, Lane 391, Sec. 3, Ho-Ping E. Rd., Taipei, Taiwan

[21] Appl. No.: 09/383,362

[22] Filed: Aug. 26, 1999

[51] Int. Cl.[7] .................................. E04G 3/00; A47F 5/00
[52] U.S. Cl. ..................................... 248/278.1; 248/280.11
[58] Field of Search ............................... 248/278.1, 274.1, 248/276.1, 280.11, 920, 918, 921

[56] References Cited

U.S. PATENT DOCUMENTS

| | | | |
|---|---|---|---|
| 3,433,444 | 3/1969 | Smith | 248/280.11 |
| 4,545,555 | 10/1985 | Koch | 248/280.11 |
| 4,691,886 | 9/1987 | Wendling et al. | 248/280.11 |
| 5,037,053 | 8/1991 | Fox et al. | 248/280.11 |
| 5,092,552 | 3/1992 | Dayton et al. | 248/280.11 |
| 5,609,316 | 3/1997 | Tgliev | 248/280.11 |
| 5,743,503 | 4/1998 | Voeller et al. | 248/284.1 |

FOREIGN PATENT DOCUMENTS

445331  9/1991  European Pat. Off. ............... 248/920

*Primary Examiner*—Ramon O. Ramirez
*Assistant Examiner*—Jerome A. De Luca
*Attorney, Agent, or Firm*—Rosenberg, Klein & Lee

[57] ABSTRACT

An angle-adjustable, auto-locking apparatus support for supporting an apparatus above a table or the like for enabling the apparatus to be conveniently adjusted to the desired elevation and angle, which includes an upright support, two connectors coupled to top and bottom ends of the upright support, a link coupled between the connectors and forming with the upright support and the connectors a parallel four-bar linkage, two spindles respectively and transversely mounted in the connector, and two pairs of spiral springs reversely mounted on the spindles at two opposite sides of each of the connectors and respectively connected between the spindles and the upright support.

15 Claims, 9 Drawing Sheets

ANGLE-ADJUSTABLE, AUTO-LOCKING APPARATUS SUPPORT

FIELD OF THE INVENTION

The present invention relates to an angle-adjustable apparatus support for supporting an apparatus above a table or the like, and more particularly to an angle-adjustable, auto-locking apparatus support, which enables the supported apparatus to be conveniently adjusted to the desired elevation and angle with less effort.

BACKGROUND OF THE INVENTION

Following fast development of data processing technology, more and more people use a computer to handle daily routine, or for playing games. A regular computer system is comprised of several parts including a mainframe, a monitor or LCD, a keyboard, etc., that occupy much table top space. When several devices are placed on the limited table top space of a table, the user may feel inconvenient during working. Further, due to limited room space, office machines and apparatus may be not ergonomically installed in suitable locations. One may get tired quickly when working under an uncomfortable working environment. Further, in order to save much table top space, an adjustable apparatus support may be installed a table to hold an apparatus, for example, the monitor of a computer system above the top of the table. An adjustable apparatus support for this purpose is generally comprised of a top swivel connector, a bottom swivel connector, and an upright support coupled between the top swivel connector and the bottom swivel connector. The bottom swivel connector is fastened to the top of a table by mounting means. The top swivel member is mounted with a joint for holding a computer peripheral apparatus. The top swivel connector and the bottom swivel connector are respectively coupled to the upright support by a respective spindle. Further, lock nut means or brake means is provided for locking the adjustable apparatus support at the desired elevation and angle. When a computer monitor is installed, the swivel connectors bear much pressure from the computer monitor. Because the swivel connectors bear much pressure from the computer monitor, it is inconvenient to adjust the elevation of the elevation and angle of the computer monitor. There are also known apparatus support means using air cylinder means for elevation adjustment control. Exemplars of these apparatus support means are seen in Taiwan Pat. Nos. 83217679 and 85211931. However, these apparatus support means still have numerous drawbacks as outlined hereinafter:

1. The use of air cylinder means greatly increases the cost of the apparatus support.
2. The apparatus support must have a certain weight to match with the weight of the air cylinder means.
3. The air pressure of the air cylinder means must be properly adjusted to a suitable level before use, however the procedure of adjusting the air pressure of the air cylinder means is complicated.
4. Because the apparatus support can be firmly kept in position only when the inside air pressure of the air cylinder means is maintained balanced, it takes much time to let the apparatus support be set into the desired elevation and angle.

SUMMARY OF THE INVENTION

It is one object of the present invention to provide an angle-adjustable, auto-locking apparatus support, which is ergonomically engineered. It is another object of the present invention to provide an angle-adjustable, auto-locking apparatus support, which enables the supported apparatus to be conveniently and quickly adjusted to the desired elevation and angle with less effort. It is still another object of the present invention to provide an angle-adjustable, auto-locking apparatus support, which is inexpensive to manufacture. An angle-adjustable, auto-locking apparatus support according to one embodiment of the present invention is generally comprised of an upright support, the upright support having a top end and a bottom end; two connectors respectively coupled to the spindles at the top and bottom ends of the upright support, the connectors each having a locating hole, the connectors including a first connector disposed at the top end of the upright support for securing an apparatus to the support support, and a second connector disposed at the bottom end of the upright support for securing the upright support to a fixed place; two spindles respectively mounted in the locating hole at each of the connectors; a plurality of spiral springs respectively mounted on the spindles, the spiral springs each having one end fastened to one of the spindles and an opposite end fastened to the upright support; and a link coupled between the connectors and forming with the connectors and the upright support a parallel four-bar linkage.

DETAILED DESCRIPTION OF THE PREFERRED EMBODIMENT

Figure 1:
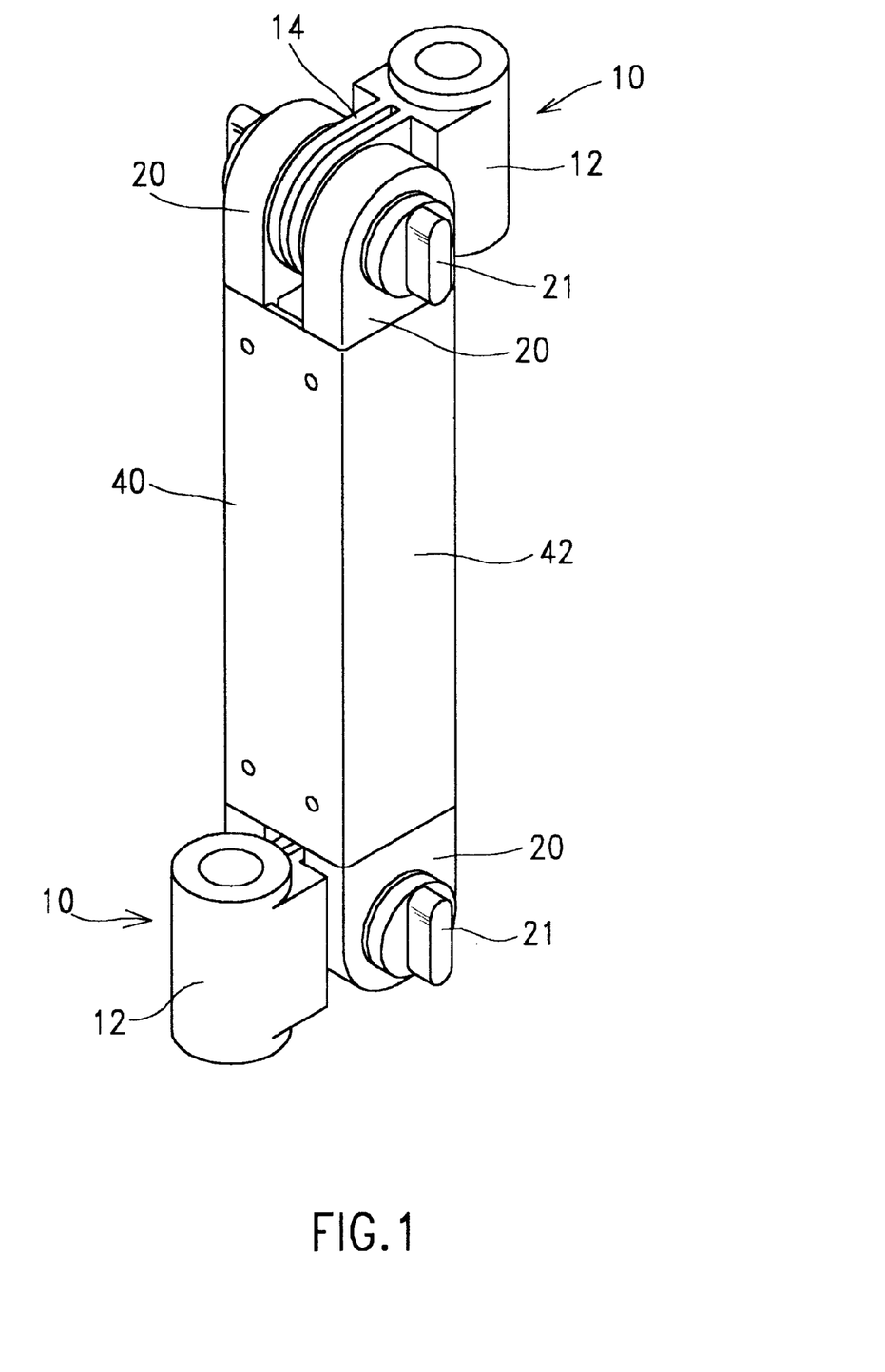
FIG. 1 illustrates the outer appearance of an angle-adjustable, auto-locking apparatus support according to a first embodiment of present invention.
Figure 2:
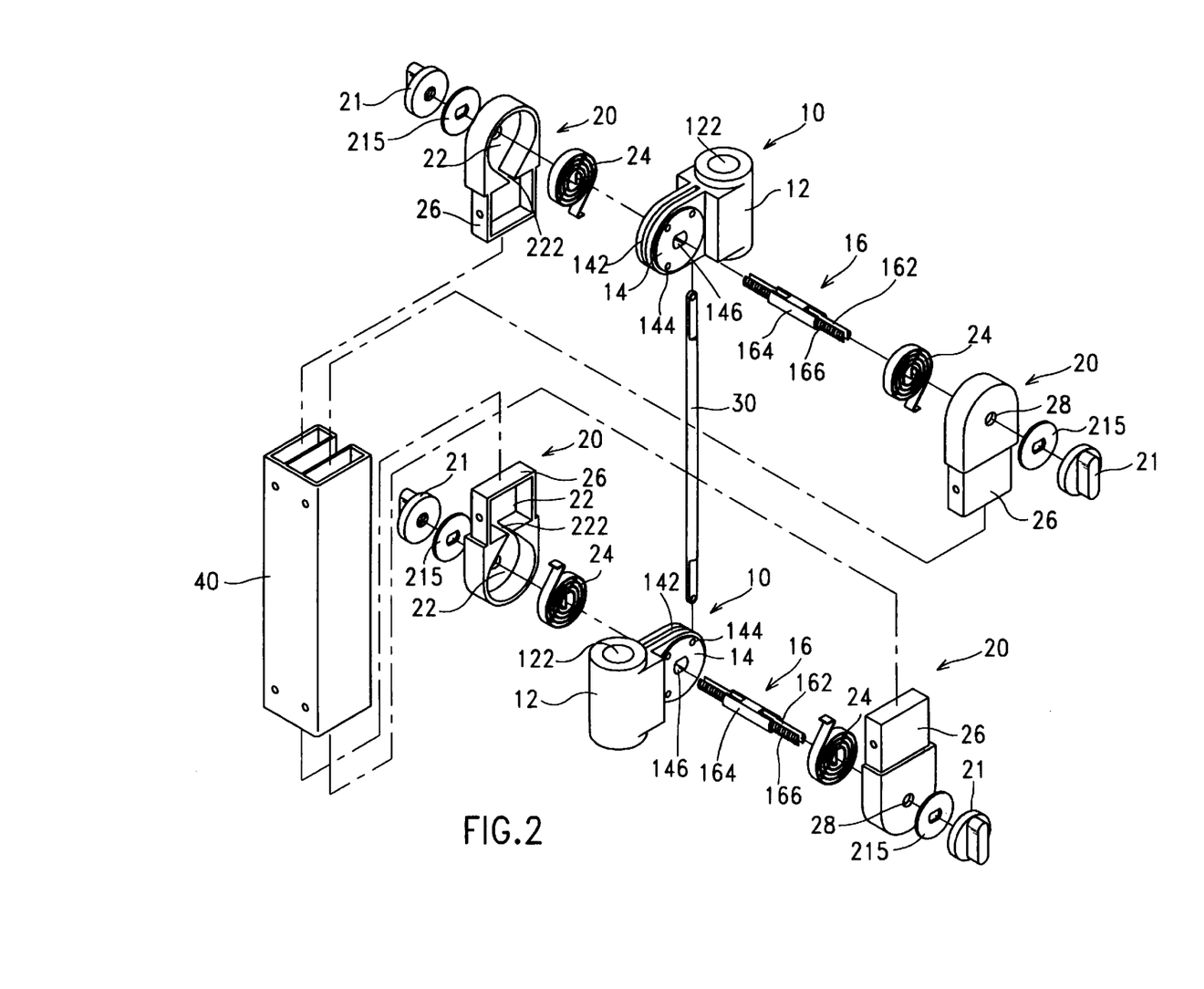
FIG. 2 is an exploded view of the angle-adjustable, auto-locking apparatus support shown in FIG. 1.
Figure 3:
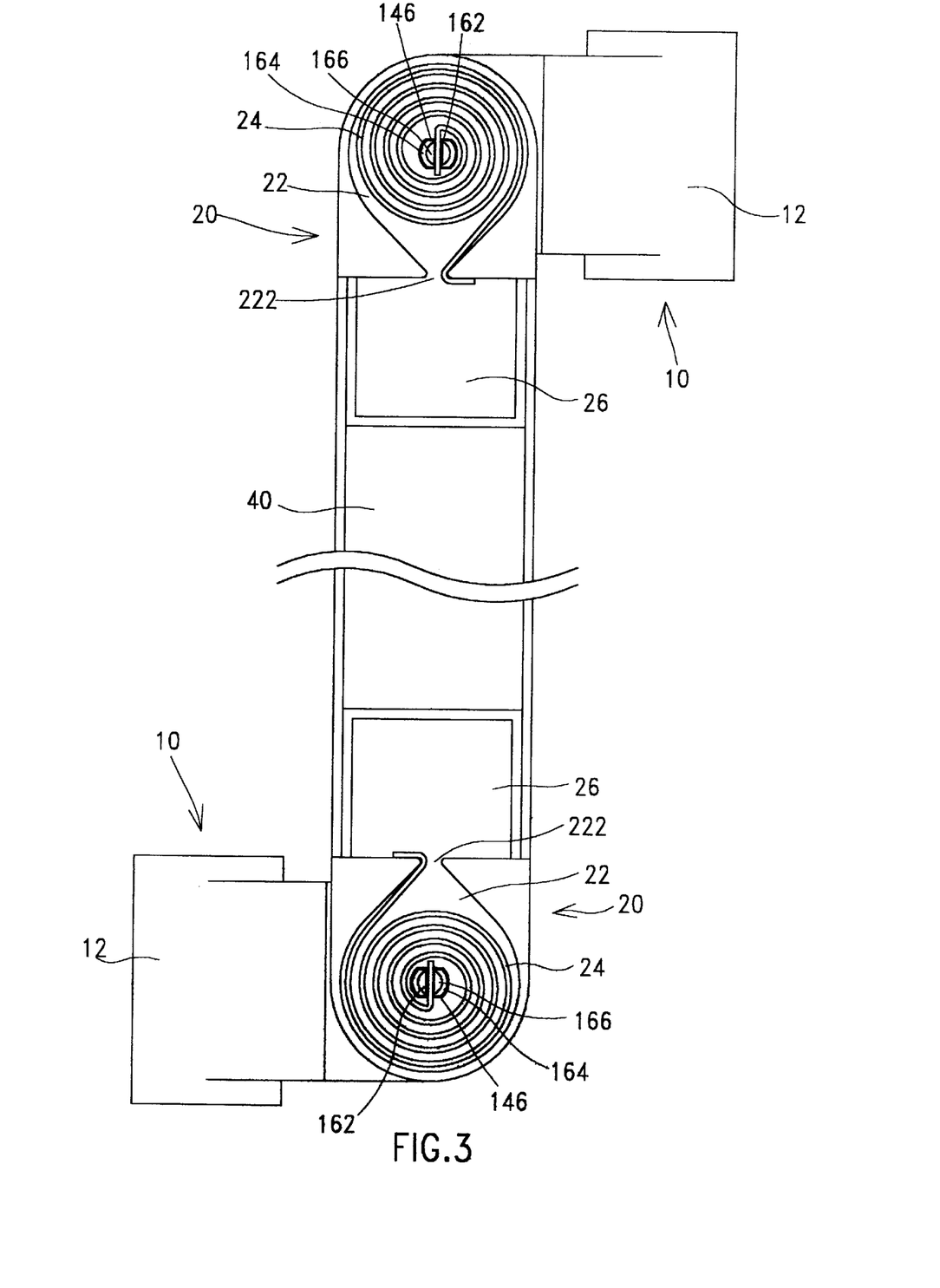
FIG. 3 is a schematic drawing showing the arrangement of the spiral springs in the angle-adjustable, auto-locking apparatus support according to the first embodiment of the present invention.

Referring to FIGS. from 1 through 3, an angle-adjustable, auto-locking apparatus support in accordance with a first embodiment of the present invention is shown comprised of an upright support 40, two connectors 10 respectively mounted on top and bottom ends of the upright support 40, two pairs of holder shells 20 respectively mounted on the top and bottom ends of two parallel hollow locating frames 42 of the upright support 40 and coupled to the connectors 10 at two opposite sides, a link 30 coupled between the connectors 10, two spindles 16 respectively and transversely mounted in the connectors 10 and connected between each pair of the holder shells 20, two pairs of spiral springs 24 respectively mounted on the spindles 16 at two opposite sides of each of the connectors 10 and respectively connected between the spindles 16 and the holder shells 20, four braking plates 215, and four cap nuts 21 respectively fastened to the spindles 16 to secure the spindles 16 to the holder shells 20 acting as a friction system.

Referring to FIGS. from 1 through 3 again, the connectors 10 each comprise a cylindrical axle holder 12 defining a longitudinally extended axle hole 122, and two parallel coupling plates 14 raised from the periphery of the cylindrical axle holder 12 and separated by a gap 142. The coupling plates 14 each have a non-circular center locating hole 146, and a plurality of through holes 144 spaced around the center locating hole 146. The noncircular center locating hole 146 can be a square, rectangular, or polygonal through hole. The spindles 16 are respectively mounted in the non-circular center locating hole 146 at each of the coupling plates 14 at each of the connectors 10, each comprising a non-circular spindle body 164 on the middle fitting the cross section of the non-circular center locating hole 146 at each of the coupling plates 14 at each of the connectors 10, two threaded extension rods 166 longitudinally extended from two distal ends of the spindle body 164 in reversed directions, and two locating notches 162 respectively provided at the threaded extension rods 166. The holder shells 20 each comprise a hollow holder portion 22, which receives one of the spiral springs 24, a through hole 28 at the center of the holder portion 22 for the passing of one threaded extension rod 168 of one of the spindles 16, a mounting portion 26 extended from the holder portion 22 in a line and fixedly connected to one locating frame 42 of the upright support 40 at one end, and an inside notch 222 between the holder portion 22 and the mounting portion 26. The spiral springs 24 are respectively mounted on the threaded extension rods 168 of the spindles 16, each having one end connected to the locating notch 162 at one threaded extension rod 168 of one of the spindles 16 and an opposite end connected to the inside notch 222 at one of the holder shells 20. The link 30 has two opposite ends respectively inserted into the gap 142 at each of the connectors 10, and pivotably connected to one through hole 144 at each of the two coupling plates 14 at each of the connectors 10 by pivot means. When assembled, the upright support 40, the link 30, and the connectors 10 form a parallel four-bar linkage.

Referring to FIG. 3 again, the two pairs of spiral springs 20 at the spindles 16 are arranged in reversed directions. When the upright support 40 is turned downwards, each pair of spiral springs 20 are driven to produce a counterclockwise torque, enabling the upright support 40 and the link 30 to be quickly returned to their former position and maintained perpendicular to the connectors 10 after disappearance of external force. Therefore, the angle-adjustable, auto-locking apparatus support occupies less storage space when not in use.

Figure 4:
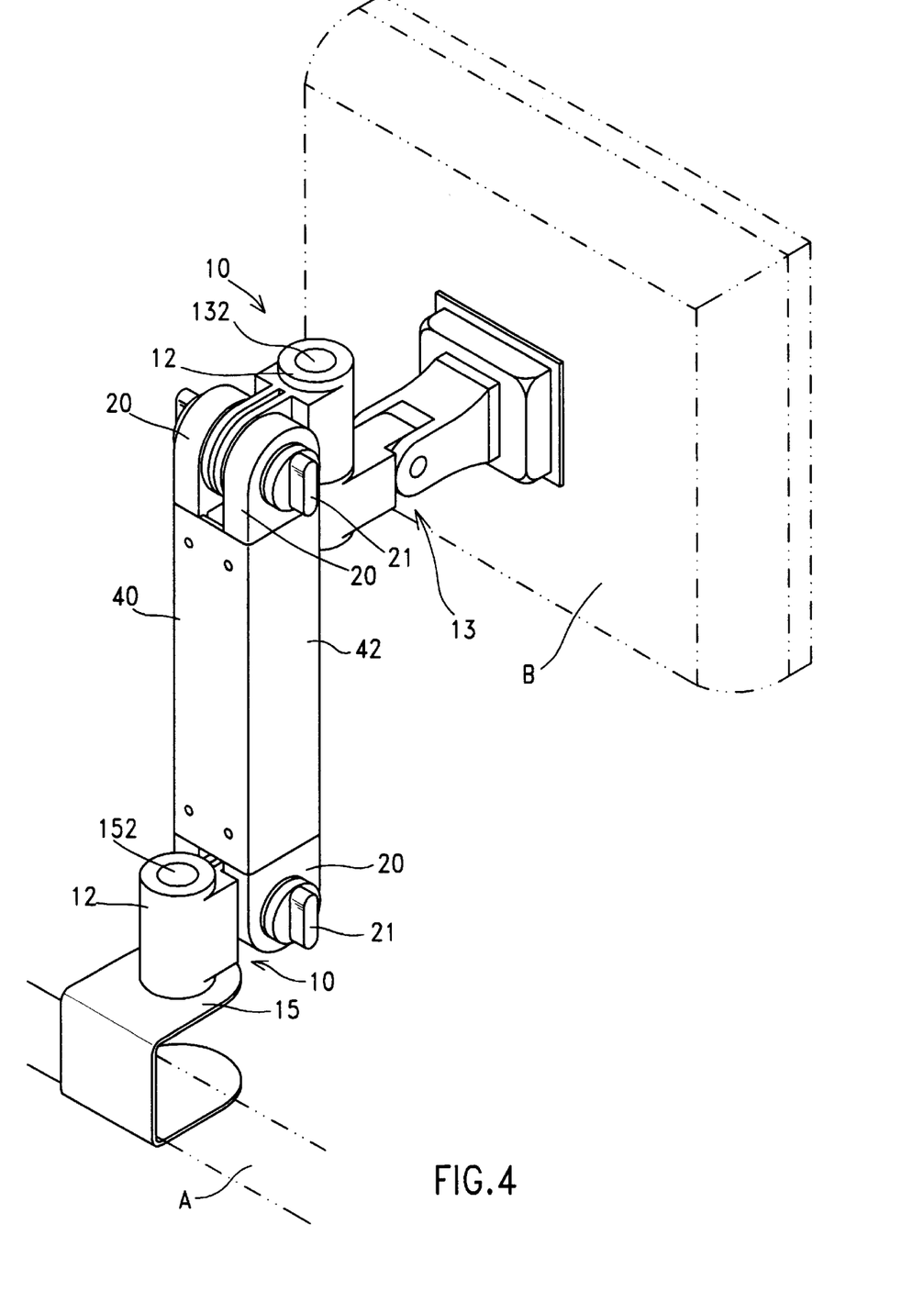
FIG. 4 is an applied view of the angle-adjustable, auto-locking apparatus support according to the first embodiment of the present invention.

Referring to FIG. 4, a clamping device 15 is fastened to the top A of a table at one side to hold the angle-adjustable, auto-locking apparatus support in place, having a mounting shaft 152 coupled to the axle hole 122 at the axle holder 12 of the connector 10 at the bottom end of the upright support 40. A joint 13 is fixedly connected to a computer peripheral apparatus, for example, a LCD B, and coupled to the connector 10 at the top end of the upright support 40. The joint 13 has a mounting shaft 132 at one end coupled to the axle hole 122 at the axle holder 12 of the connector 10 at the top end of the upright support 40. After installation, the mounting shaft 132 can be rotated with the joint 13 in the axle hole 122 at the axle holder 12 of the corresponding connector 10 to change the angular position of the LCD B horizontally, and the angle-adjustable, auto-locking apparatus support can be turned about the mounting shaft 152 of the clamping device 15 to the desired angle.

Figure 5A:
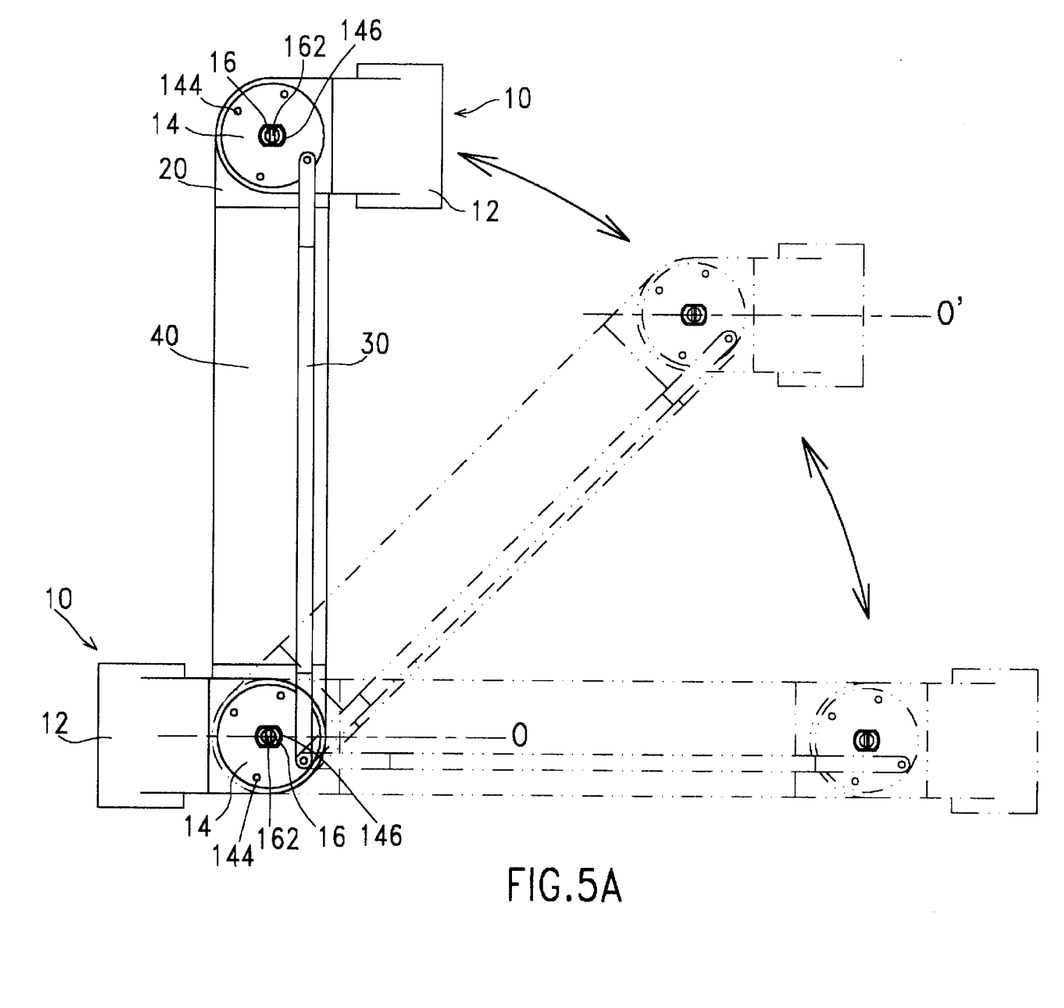
FIG. 5A is a schematic drawing showing the angle-adjustable, auto-locking apparatus support of the first embodiment of the present invention adjusted before installation of the load.

Referring to FIG. 5A, when the angle-adjustable, auto-locking apparatus support stands idle (bears no load), the upright support 40 and the link 30 are maintained in a vertical position, and the connectors 10 are maintained perpendicular to the upright support 40, and there is a minor gap left between the periphery of the spindle body 164 of each spindle 16 and the periphery of the center locating hole 146 at each coupling plate 14 of the corresponding connector 10. At this stage, the axis 0', which passes through the center of the center locating hole 146 at each coupling plate 14 of the connector 10 at the top end of the upright support 40, is maintained in parallel to the axis 0, which passes through the center of the center locating hole 146 at each coupling plate 14 of the connector 10 at the bottom end of the upright support 40. When turning the upright support 40 downwards from the vertical position toward the horizontal position, the axes 0 and 0' are constantly maintained in parallel, therefore the upright support 40 and the link 30 can be conveniently turned to the desired angle. When the external force is disappeared, the upright support 40 and the link 30 are immediately returned to their former vertical position.

Figures 5B, 5C:
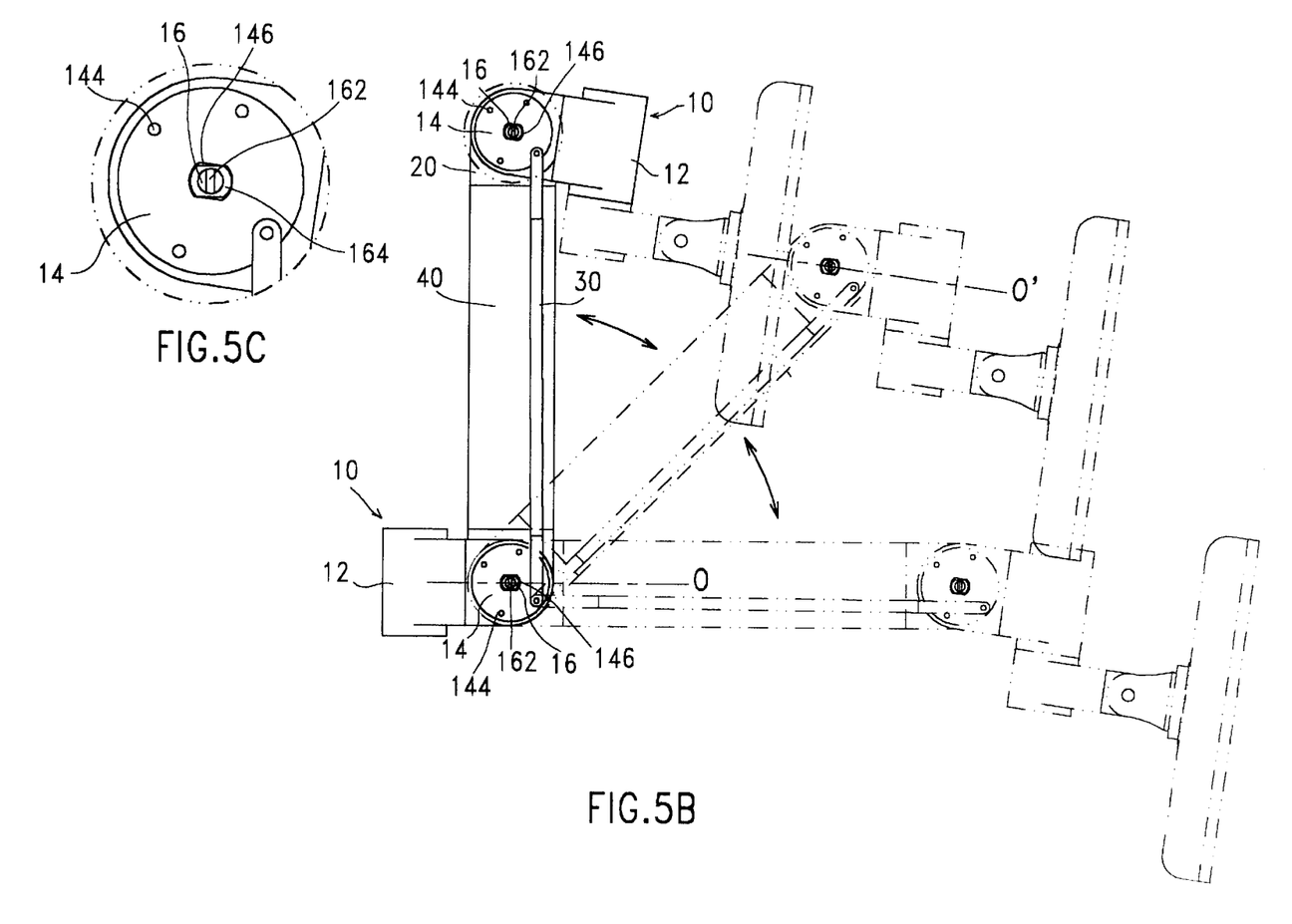
FIG. 5B is a schematic drawing showing the angle-adjustable, auto-locking apparatus support of the first embodiment of the present invention adjusted after installation of the load.
FIG. 5C is an enlarged view of a part of FIG. 5B.

Referring to FIGS. 5B and 5C, when the angle-adjustable, auto-locking apparatus support bears an apparatus, for example, a LCD B (see FIG. 4), the pressure of the LCD B forces the top-sided connector 10 to be rotated through an angle, thereby causing the coupling plates 14 to be maintained in engagement with the periphery of the spindle body 164 of the corresponding spindle 16 (see FIG. 5C), and therefore the parallel four-bar linkage is automatically locked. At this time, the bottom-sided connector 10 is maintained immovable, the axis 0 is still maintained in horizontal. Therefore, the axes 0 and 0' are not maintained in parallel perfectly at this stage, the upright support 40 and the link 30 are maintained in position, and the LCD B is firmly supported on the angle-adjustable, auto-locking apparatus support in position. When adjusting the elevation of the LCD B, the LCD B is lifted, enabling the axes 0 and 0' to be returned to the parallel status, and then the upright support 40 is turned to the desired angle. Because of the effect of the spiral springs 24, the LCD B can be conveniently lifted with less effort. Therefore, it requires less effort to lift the LCD B to the desired elevation.

Further, the material strength determines the spring power of the spiral springs 24, and the force required to adjust the position of the upright support 40. By means of the gravity weight of the apparatus supported on the angle-adjustable, auto-locking apparatus support, the spindle 16 is automatically forced into engagement with the coupling plates 14 of the corresponding connector 10, enabling the upright support 40 to be firmly retained in any adjusted position. Because of the effect of the spring power of the spiral springs 24 and the effect of the parallel four-bar linkage and the friction system, the apparatus B can be moved to the desired elevation with one single hand with less effort, and the angle-adjustable, auto-locking apparatus support is automatically locked in position after each adjustment.

Figure 6:
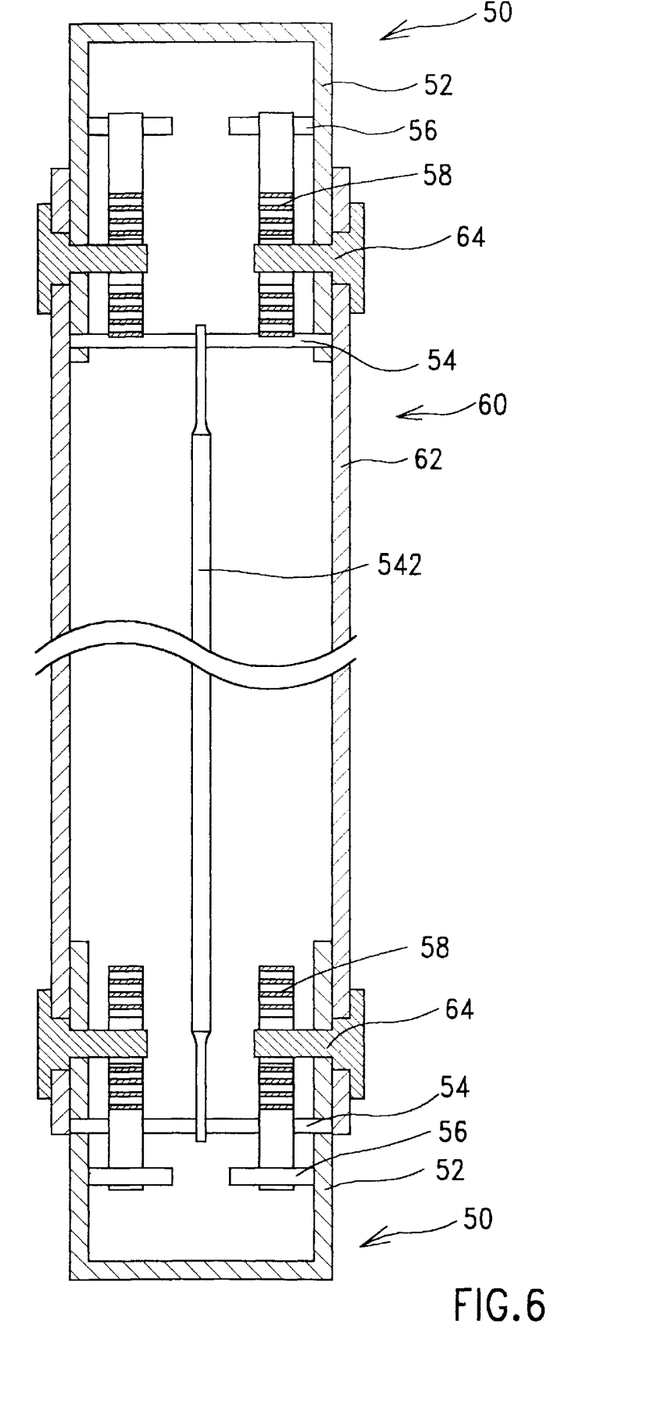
FIG. 6 is a front view in section of an angle-adjustable, auto-locking apparatus support according to a second embodiment of the present invention.
Figure 7:
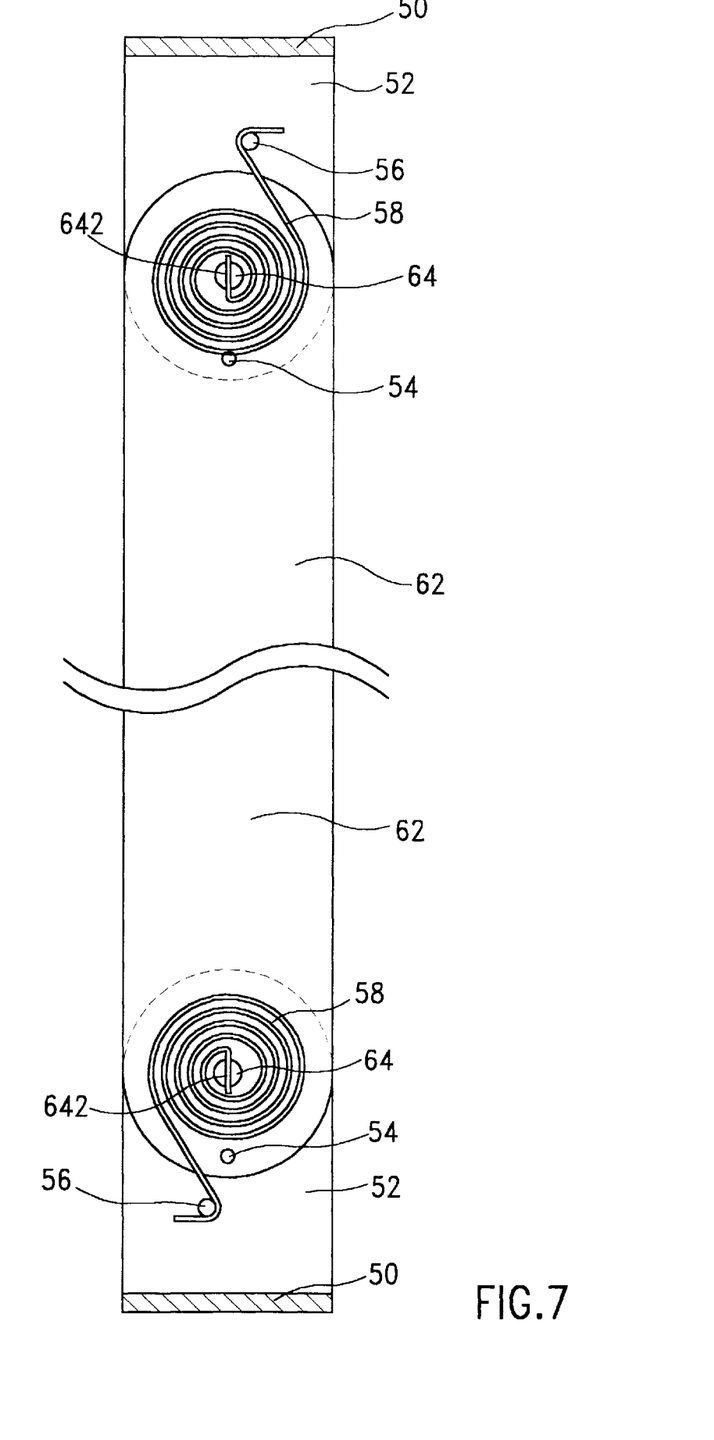
FIG. 7 is a side view of FIG. 6.

FIGS. 6 and 7 show an angle-adjustable, auto-locking apparatus support according to a second embodiment of the present invention. According to this embodiment, the angle-adjustable, auto-locking apparatus support comprises an upright support 60 having two parallel side walls 62 extended in longitudinal direction, two connectors 50 respectively coupled to the parallel side walls 62 of the upright support 60 by respective bolts 64 and arranged at top and bottom sides of the upright support 60, two spindles 54 respectively and transversely mounted in the connectors 50 between two parallel side walls 52 of each of the connectors 50, a link 542 coupled between the spindles 54, and two pairs of spiral springs 58 respectively mounted on the bolts 64. The spiral springs 58 each have one end fastened to an end notch 642 at one bolt 64, and an opposite end fastened to a locating rod 56 at one side wall 52 of one of the connectors 50. This alternate form achieves also the aforesaid parallel four-bar linkage automatic locking effect, enabling the upright support 60 to be turned upwards or downwards to the desired angle and automatically locked in the adjusted angular position.

Figure 8:
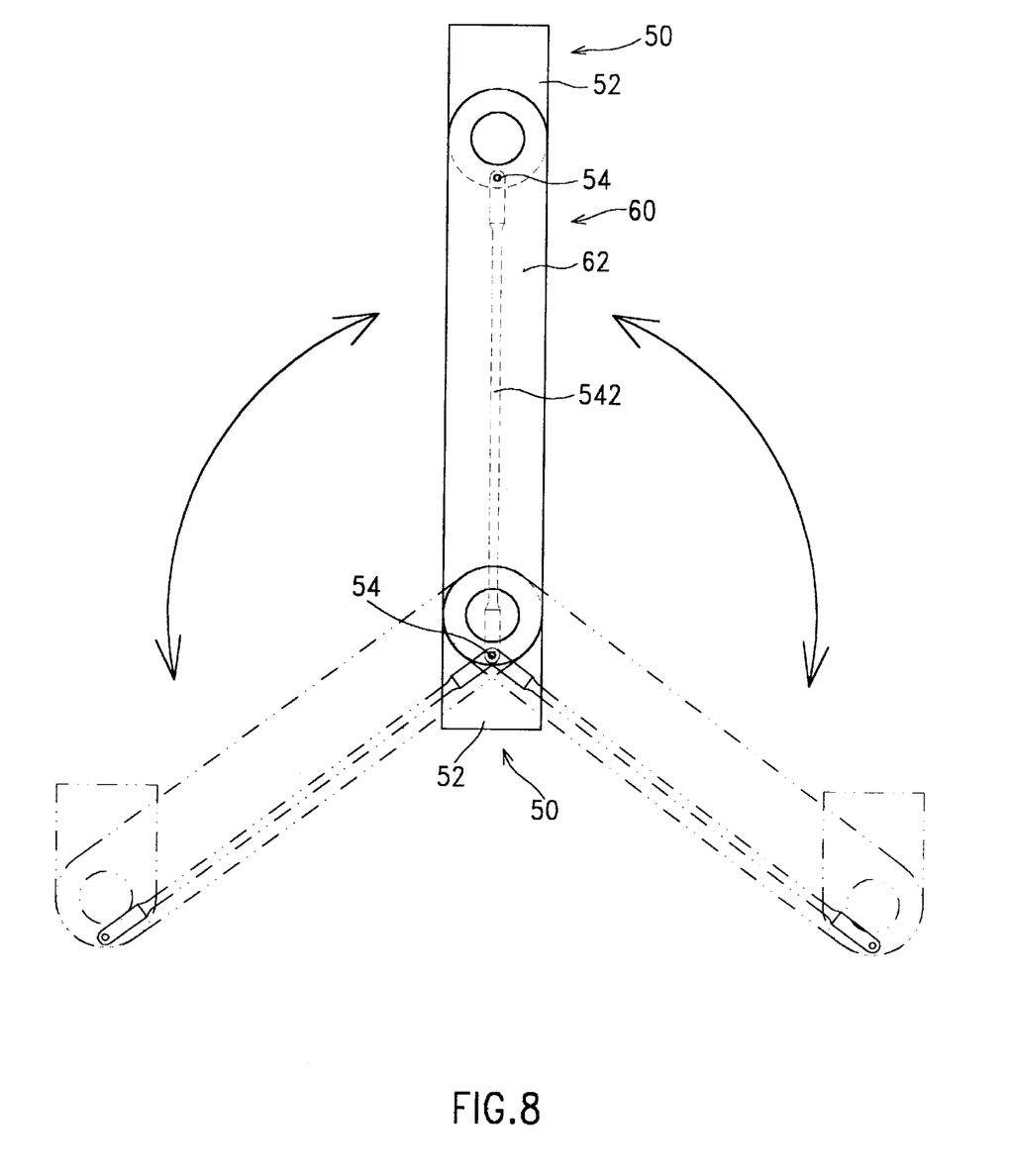
FIG. 8 is a schematic drawing showing the angle-adjustable, auto-locking apparatus support of the second embodiment of the present invention adjusted.

FIG. 8 shows the angle-adjustable, auto-locking apparatus support of the second embodiment of the present invention adjusted. After installation, the upright support 60 can be turned about the two bottom sided bolts 64 to adjust the elevation of the loaded apparatus. When the external force is released from the upright support 60, the upright support 60 is immediately locked in the adjusted position. Because of the effect of the spring power of the spiral springs 58, the angle-adjustable, auto-locking apparatus support can conveniently adjusted to the desired angular position with less effort. Further, because the bolts 64 do not hinder the turning of the link 542 with the upright support 60, the upright support 60 can be turned about the two bottom sided bolts 64 over 180° angle (see FIG. 8).

It is to be understood that the drawings are designed for purposes of illustration only, and are not intended for use as a definition of the limits and scope of the invention disclosed.

What the invention claimed is:

1. An angle-adjustable, auto-locking apparatus support comprising:
   an upright support having a top end and a bottom end;
   a pair of connectors respectively coupled to a pair of spindles at the top and bottom ends of said upright support, said connectors each having a locating hole such that said two spindles are respectively mounted in said locating holes of each of said connectors, said connectors including a first connector disposed at the top end of said upright support for securing an apparatus to said support, and a second connector disposed at the bottom end of said upright support for securing said upright support to a fixed surface;
   a plurality of spiral springs respectively mounted on said spindles, said spiral springs each having one end fastened to one of said spindles and an opposite end fastened to said upright support and;
   a link coupled between said connectors and forming with said connectors and said upright support a parallel four-bar linkage, each of said connectors comprising a cylindrical axle holder for coupling to said apparatus to be supported, a pair of coupling plates raised from the periphery of said cylindrical axle holder and coupled to one of said spindles, said link having one end received within a gap formed between said coupling plates.

2. The angle-adjustable, auto-locking apparatus support of claim 1 wherein said coupling plates each have a hole pivoted to one end of said link.

3. The angle-adjustable, auto-locking apparatus support of claim 1 wherein said cylindrical axle holder defines an axle hole for mounting.

4. The angle-adjustable, auto-locking apparatus support of claim 1 wherein said spindles each have two notches at two opposite ends for holding one end of each of said spiral springs.

5. The angle-adjustable, auto-locking apparatus support of claim 1 further comprising two pairs of holder shells respectively and fixedly fastened to the top and bottom ends of said upright support and coupled to said spindles at two opposite sides of each of said connectors, said holder shells each comprising a hollow holder portion, which receives one of said spiral springs, a through hole at the center of said holder portion for the passing of one end of one of said spindles, and a mounting portion extended from said holder portion and fixedly connected to said upright support.

6. The angle-adjustable, auto-locking apparatus support of claim 5 wherein said holder shells each further comprise an inside notch disposed between the respective holder portion and the respective mounting portion for holding one end of one of said spiral springs.

7. The angle-adjustable, auto-locking apparatus support of claim 5 wherein said spindles each comprise a spindle body having a non-circular cross section mounted in the locating hole at each of said connectors, and two threaded extension rods longitudinally extended from two distal ends of said spindle body in reversed directions and respectively inserted into a through hole at the center of the holder portion of each of said holder shells and screwed up with a respective cap nut.

8. The angle-adjustable, auto-locking apparatus support of claim 1 wherein said spiral springs are respectively mounted on said spindles, and disposed at one side of said connectors.

9. The angle-adjustable, auto-locking apparatus support of claim 1 further comprising a braking plate secured to said cap nut to said mounting portion.

10. The angle-adjustable, auto-locking apparatus support of claim 9 wherein said spiral springs are arranged in pair and mounted on said spindles in reversed directions.

11. The angle-adjustable, auto-locking apparatus support of claim 1 wherein said upright support comprises two parallel hollow locating frames extended in longitudinal direction.

12. An angle-adjustable, auto-locking apparatus support, comprising:
   an upright support having two parallel side walls;
   two pairs of bolts respectively mounted in the side walls of said upright support near top and bottom ends of said upright support;
   two connectors respectively coupled to said bolts at top and bottom ends of said upright support, said connectors each having two parallel side walls and a transverse locating hole through the parallel side walls;
   two spindles respectively and transversely mounted in the locating holes between the two parallel side walls of each of said connectors;
   a plurality of spiral springs respectively mounted on said bolts inside said upright support, said spiral springs each having one end respectively fastened to said bolts and an opposite end respectively fastened to said connectors, each of said bolts having an end notch for holding one end of each of said spiral springs; and
   a link coupled between said spindles, and forming with said upright support arm and said connectors a parallel four-bar linkage.

13. The angle-adjustable, auto-locking apparatus support of claim 12 wherein said connectors each comprise at least one locating rod on the inside for holding one end of each of said spiral springs.

14. The angle-adjustable, auto-locking apparatus support of claim 12 wherein the two bolts of each of said pairs of bolts are spaced from each other by a gap so that said link can be moved through the gap between the two bolts of one of said pairs of bolts when said link is turned with said upright support relative to one of said connectors.

15. The angle-adjustable, auto-locking apparatus support of claim 12 wherein the spiral springs are arranged in pair and respectively coupled to said connectors in reversed direction.

\* \* \* \* \*